United States Patent [19]

Shuttleworth

[11] 3,822,006

[45] July 2, 1974

[54] APPARATUS FOR DIVIDING MOVING OBJECTS INTO ROWS

[75] Inventor: Howard P. Shuttleworth, Warren, Ind.

[73] Assignee: Shuttleworth Machinery Corporation, Huntington, Ill.

[22] Filed: June 19, 1972

[21] Appl. No.: 264,352

[52] U.S. Cl............................................ 198/31 AC
[51] Int. Cl........................................... B65g 47/26
[58] Field of Search........... 198/31 AC, 203; 74/436

[56] References Cited
UNITED STATES PATENTS

| | | | |
|---|---|---|---|
| 1,166,120 | 12/1915 | Fox.................................. | 74/436 X |
| 2,591,089 | 4/1952 | Moon................................. | 198/203 |
| 2,633,224 | 3/1953 | Thebault......................... | 198/31 AC |
| 3,193,078 | 7/1965 | Amenta et al.................. | 198/31 AC |

*Primary Examiner*—Evon C. Blunk
*Assistant Examiner*—Douglas D. Watts
*Attorney, Agent, or Firm*—Woodard, Weikart, Emhardt & Naughton

[57] ABSTRACT

An apparatus for dividing moving objects from a row into a plurality of rows. A hollow arm is pivotally mounted above a conveyor which moves a row of objects through the arm. The discharge end of the arm is sequentially positioned to discharge a number of objects into a row at a time of a plurality of parallel rows. The arm is connected to a rack engaged by a pinion operatively connected through a Geneva mechanism to a clutch and motor. The rotating output shaft of the motor is coupled by the clutch to the driver wheel of the Geneva mechanism. The driver wheel is engaged with the driven wheel of the Geneva mechanism thereby providing intermittent rotational motion of the pinion and the intermittent movement of the rack. A counting system is provided to count the number of objects discharged from the arm into a given lane and to provide a signal for engaging the clutch to pivot the arm to the next lane. An end of cycle switch is operated by a cam to disengage the clutch upon positioning of the arm at the next lane. A pair of switches are provided at the ends of the arc through which the arm pivots so as to reverse the rotational output of the motor.

4 Claims, 9 Drawing Figures

3,822,006

APPARATUS FOR DIVIDING MOVING OBJECTS INTO ROWS

BACKGROUND OF THE INVENTION

1. Field of the Invention:

This invention is in the field of feeding devices.

2. Description of the Prior Art:

When automatically packing objects into a container such as a box, the objects must first be arranged in a pattern of rows. The objects are moved by a conveyor and may be divided into a number of rows by means of a plurality of guide walls of varying lengths mounted above the conveyor. Such guide walls are disclosed in the U.S. Pat. No. 3,386,224 issued to J. J. Shuttleworth and entitled Case Packer. Another apparatus utilizes a series of rollers which are adapted to receive objects arranged in a scrambled position with a plurality of oppositely traveling belts associated with the rollers for throwing the objects into rows as they progress along the rollers. Such an apparatus is disclosed in the U. S. Pat. No. 2,715,957 issued to Charles A. Shuttleworth.

Many of the prior art devices which divide a single row into a plurality of rows are not readily adapted or mountable to existing packing machines. The device disclosed herein may be readily mounted to existing packing machines as it is suspendedly mounted above the conveyor. Another advantage of the device disclosed herein as compared to the prior art devices is the adaptability of the device to particular packing requirements. For example, the number of units discharged into any given row may be easily controlled as well as the number of rows. Likewise, the device may be quickly changed so as to receive a different size and configuration of the objects to be packaged. Many of the prior art devices are unstable and provide a jerky motion when distributing the moving objects into the plurality of rows. The device disclosed herein includes a Geneva mechanism which provides a very smooth acceleration and deceleration as the dividing device moves from row to row.

SUMMARY OF THE INVENTION

One embodiment of the present invention is an apparatus for dividing moving objects from one row into a plurality of rows each a separate path comprising a frame, an arm having a channel and a discharge end through which the moving objects pass with the arm being movably mounted to the frame, and drive means operably connected to the arm being operable to provide motion to the arm and move the discharge end past each path, the drive means includes interrupting means operable to interrupt the motion and stop the discharge end at each path.

It is an object of the present invention to provide a new and improved apparatus for dividing moving objects into rows.

It is a further object of the present invention to provide an apparatus for dividing a row of moving objects into a plurality of rows in a stable and smooth manner.

Yet another object of the present invention is to provide an apparatus for dividing moving objects into a plurality of rows which is easily installed on packing machines and which is easily adaptable to the particular size of the moving object as well as the particular packing requirements.

Related objects and advantages of the present invention will be apparent from the following description.

DESCRIPTION OF THE PREFERRED EMBODIMENT

Figure 1:
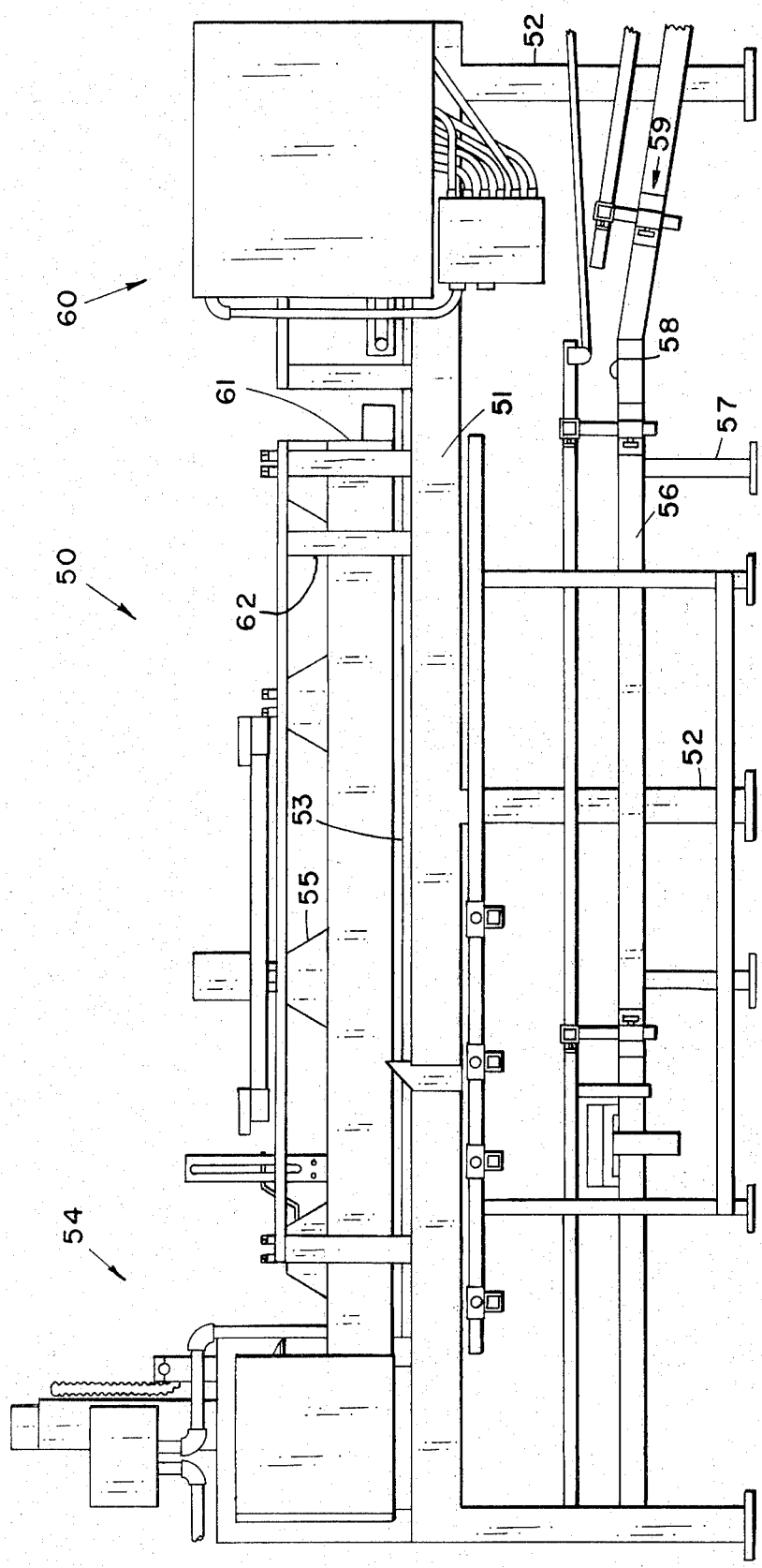
FIG. 1 is a side view of an arranging and packaging machine incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an arranging and packing machine 50 which includes a main frame 51 rigidly mounted atop a plurality of legs 52. Frame 50 includes a conveying system 53 upon which objects are moved towards a packing device 54. A plurality of guides 55 are suspendedly mounted on frame 51 above conveying system 53 for directing a plurality of rows of the moving objects towards the packing device. Immediately adjacent frame 51 is a lower frame 56 supported by legs 57. Frame 56 has movably mounted thereon a conveyor 58 which moves boxes in the direction of arrow 59 towards packing device 54. The boxes are directed beneath packing device 54 and positioned to receive the moving objects lowered into the box by the packing device 54. Such an arranging and packing machine 50 excluding the apparatus for dividing the moving objects into rows to be subsequently disclosed, is disclosed in the U. S. Pat. No. 3,386,224 issued to J. J. Shuttleworth and the disclosure contained therein is hereby incorporated by reference.

Figure 2:
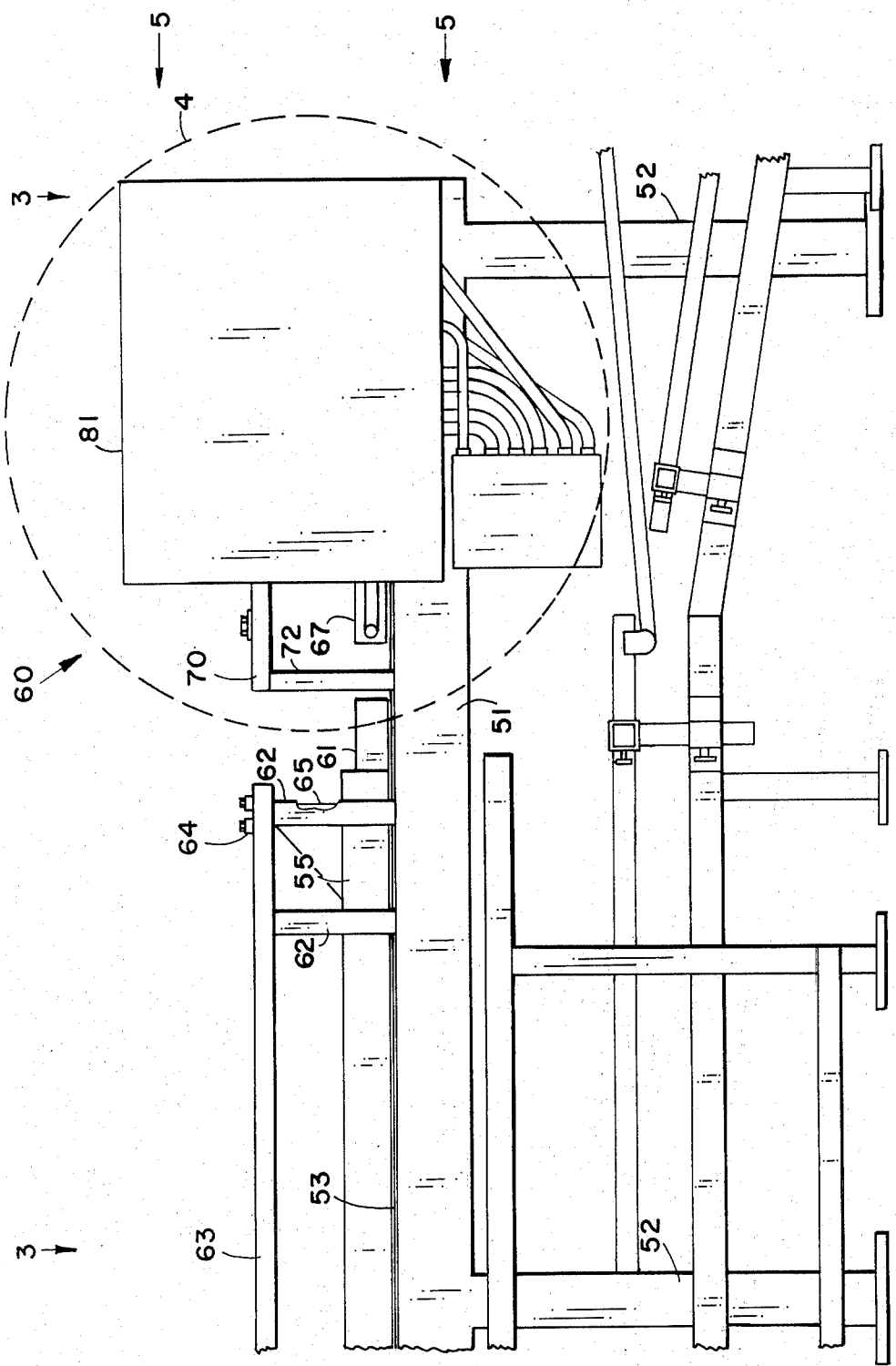
FIG. 2 is an enlarged fragmentary view of the right portion of the machine shown in FIG. 1 which employs the apparatus for dividing moving objects into rows.
Figure 3:
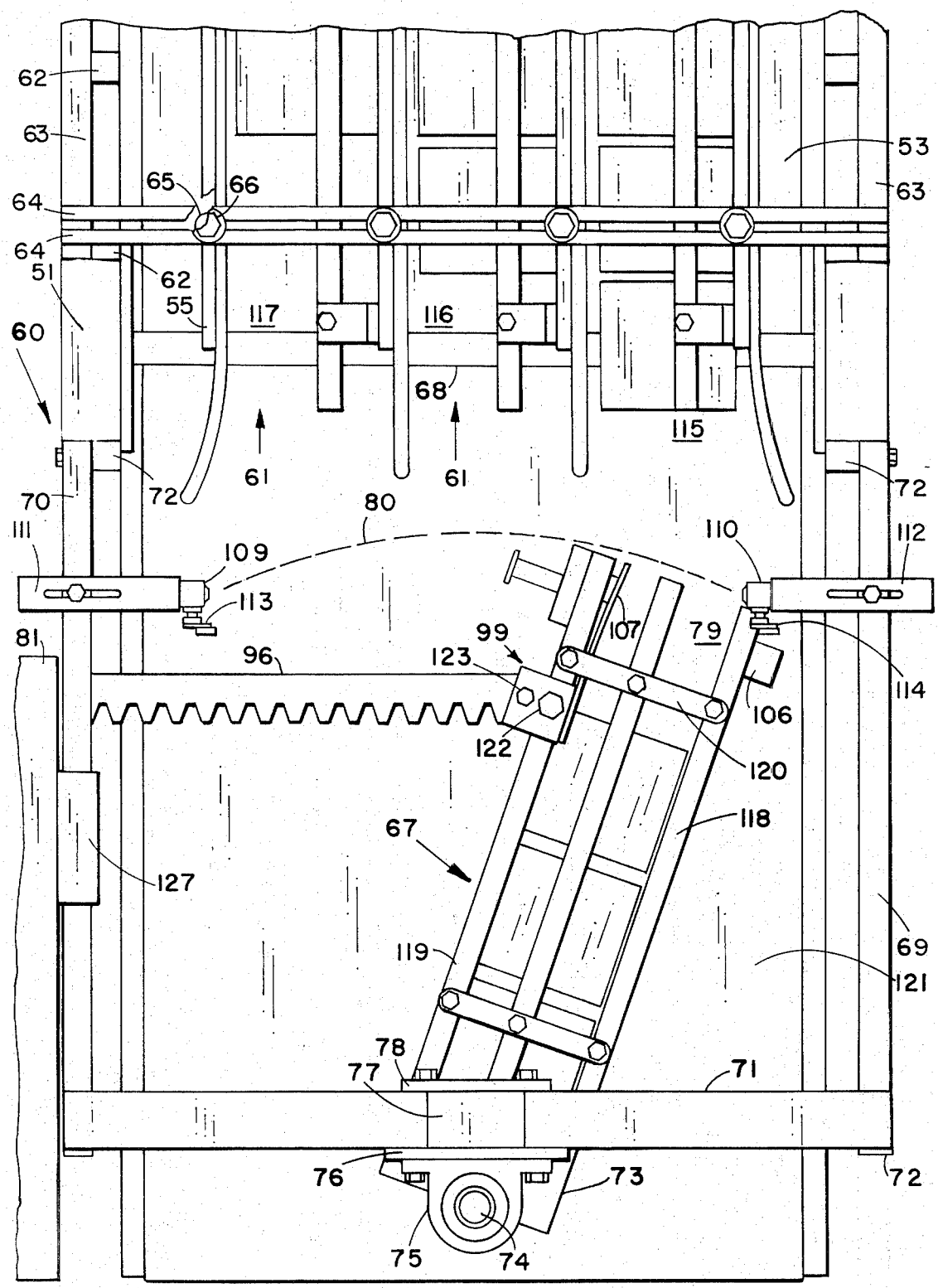
FIG. 3 is a fragmentary top view looking in the direction of arrows 3—3 of FIG. 2.

Apparatus 60 divides moving objects in one row into a plurality of rows. Apparatus 60 is positioned at the inlet end 61 of dividers 55. As shown in FIG. 3, there are a sufficient number of dividers 55 to form three separate rows 117, 116 and 115 of objects. Apparatus 60 includes a pivoting arm having a channel through which a single row of moving objects pass. The arm pivots sequentially to each inlet of the three rows so as to discharge a number of objects into one row at a time. FIGS. 2 and 3 are enlarged fragmentary side and top views respectively of apparatus 60 positioned adajcent the inlets 61 of the rows.

A plurality of rigid posts 62 are fixedly mounted atop frame 51. The top ends of posts 62 are secured to and support beams 63 which extend towards packing device 54. Pairs of cross bars 64 have their opposite ends secured to beams 63 with dividers 55 suspendedly mounted from bars 64. Each divider 55 is secured to rods 65 which threadedly receive fasteners 66 extending between cross bars 64. Fasteners 66 may be loosened therefore allowing for the repositioning of dividers 55.

Figure 5:
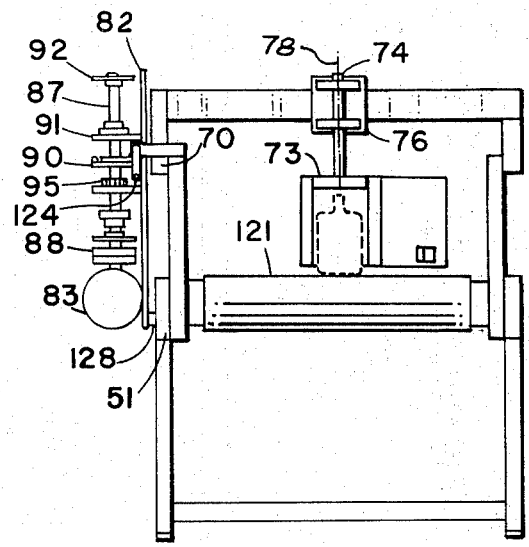
FIG. 5 is a fragmentary end view on a reduced scale looking in the direction of arrows 5—5 of FIG. 2.
Figure 6:
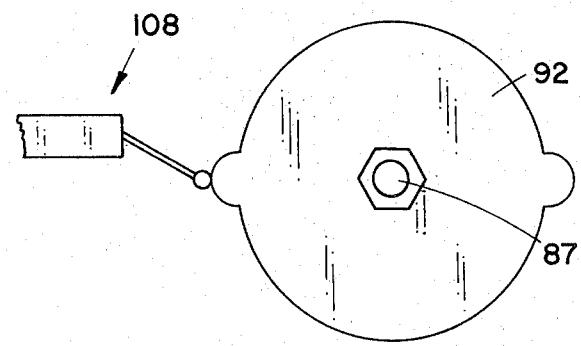
FIG. 6 is an enlarged fragmentary top view looking in the direction of arrows 6—6 of FIG. 4.

Apparatus 60 includes an arm 67 which is pivotally mounted above frame 51. A pair of horizontally extending beams 69 and 70 are secured to cross bar 71 with the beams and cross bar rigidly mounted atop posts 72 secured to frame 51. Arm 67 has a top plate 73 secured thereto which has an upstanding rod 74 bearingly received by a pair of bearings 75 mounted to plate 76. Plate 76 is secured to a pair of plates 77 straddling cross bar 71. Another plate 78 is positioned on the opposite side of cross bar 71 and is secured to plates 77 by conventional fastening devices. Arm 67 is pivotable about pivot axis 78 (FIG. 5) which passes centrally through rod 74. The discharge end 79 (FIG. 3) is therefor movable through an arc 80 so as to be postionable adjacent to each inlet 61 of the three rows 115 through 117.

Figure 4:
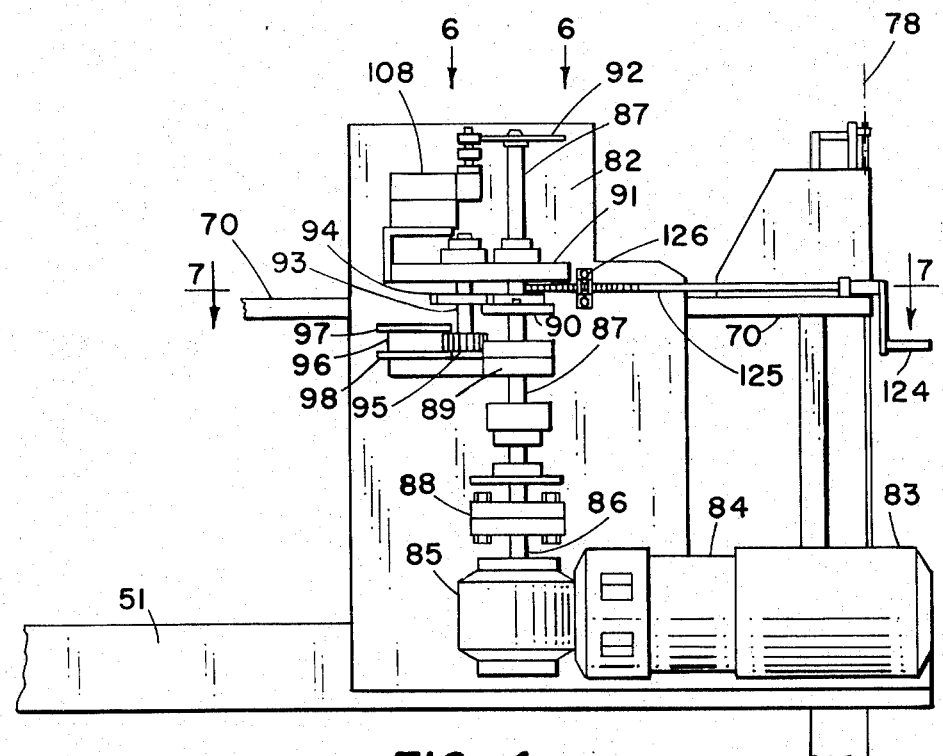
FIG. 4 is an enlarged view of the area enclosed by circle 4 of FIG. 2 with the outer covering removed therefrom.

A sheet metal cabinet 81 (FIG. 2) encloses the drive means for pivoting arm 67. Cabinet 81 is removed from FIG. 4 in order to show the drive means. Plate 82 is slidably mounted on beam 70 and has the drive means mounted thereon. The drive means includes a motor 83 having a rotatable output connected to clutch 84 which in turn is connected to gear reducer 85. The rotatable output shaft 86 of gear reducer 85 is connected to shaft 87 by coupling 88. Shaft 87 extends through bearing plate 89 secured to plate 82. Shaft 87 then extends through a driver wheel 90 of a Geneva mechansim and into another bearing plate 91 mounted to plate 82 and having a cam plate 92 secured to the top end of the shaft. A second shaft 93 is bearingly mounted to plates 91 and 89 and has the driven wheel 94 of the Geneva mechanism mounted thereon. In addition, a pinion 95 is fixedly secured to shaft 93. Wheels 90 and 92 are keyed to shaft 87 so as to prevent relative motion between the wheels and the shaft. Likewise, wheel 94 and pinion 95 are keyed to shaft 93 so as to prevent relative motion between the wheel and pinion with respect to shaft 93.

A horizontal rack 96 extends freely through plate 82. A top horizontal strip 97 and a bottom horizontal strip 98 are mounted to plate 82 with the rack passing between the strips. The guide strips 97 and 98 are lined with a bearing material so as to facilitate ease of movement of the rack through plate 82. The teeth of rack 96 are in meshing engagement with the teeth of pinion 95. The opposite end of rack 96 (FIG. 3) is connected to arm 67 by coupling 99. Thus, by activating motor 83 and engaging clutch 84, shaft 87 may be caused to rotate thereby imparting motion to driver wheel 90 and driven wheel 94 as well as pinion 95. Rotation of pinion 95 causes rack 96 to move inward and outward with respect to plate 82 thereby pivoting arm 67 about axis 78.

Figure 7:
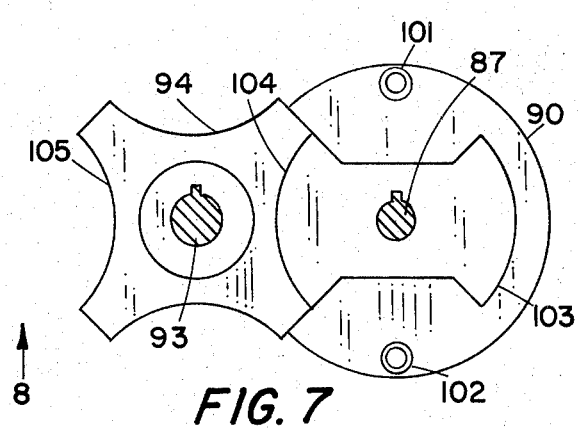
FIG. 7 is an enlarged cross sectional view taken along line 7—7 of FIG. 4 and viewed in the direction of the arrows.
Figure 8:
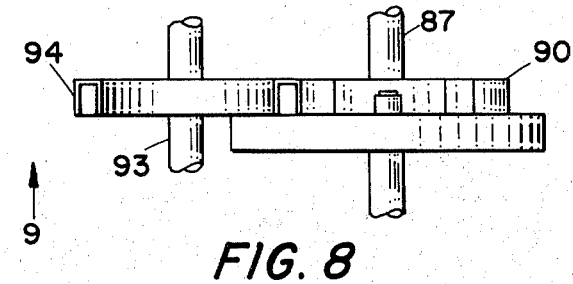
FIG. 8 is an end view looking in the direction of arrows 8—8 of FIG. 7.
Figure 9:
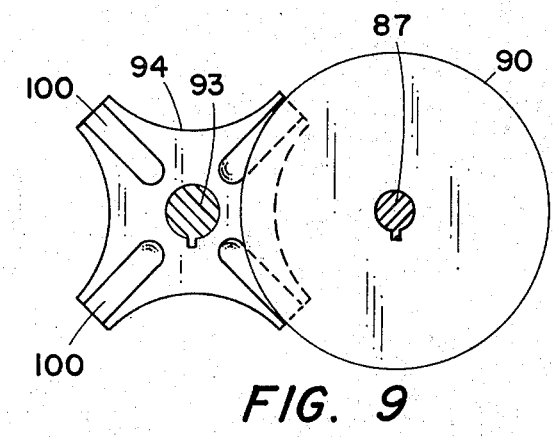
FIG. 9 is a bottom view looking in the direction of arrows 9—9 of FIG. 8.

The Geneva mechanism includes driver wheel 90 and driven wheel 94. A cross sectional top view of the Geneva mechanism is shown in FIG. 7 with a side and bottom view shown respectively in FIGS. 8 and 9. The Geneva mechanism is utilized to convert continuous rotational input motion to intermittent rotational output motion Driven wheel 94 has four slots 100 which extend radially outward from shaft 93 being located 90° apart. Driver wheel 90 has a pair of rollers 101 and 102 rotatably mounted thereatop which engage one of the slots 100. As a result, one complete revolution of driver wheel 90 results in one-half revolution of driven wheel 94. The concentric surfaces 103 and 104 engage the concave surfaces 105 which extend between each pair of slots before the rollers engage slots 100. When surfaces 103 or 104 are engaged with one of the surfaces 105, the driven wheel is prevented from rotating while one of the rollers is moving around to engage the next successive slot. Thus, intermittent motion is imparted to the rack so as to align the discharge end of arm 67 sequentially with each input 61.

A source of light 106 (FIG. 3) and an electric eye 107 are mounted to arm 67 at opposite sides of the dischrge end 79. Thus, as the moving objects pass through the arm and through the discharge end, the electric eye will provide a suitable electrical signal to an electronic counter. At a predetermined count, the counter will provide a signal to clutch 84 which couples the motor to the Geneva mechanism thereby starting rotation of the Geneva driver wheel. The discharge end of arm 67 will therefore be sequentially positioned to the next input 61. To disengage the clutch, cam plate 92 is provided which is mounted fixedly atop shaft 87. A switch 108 is mounted to plate 91 and has a movable arm which is engageable by either end of the elongated cam plate 92. In one complete revolution of plate 92, the movable arm of switch 108 will be engaged twice. The opposite protruding ends of plate 92 which engage switch 108 are located 90 degrees with respect to rollers 101 and 102. Switch 108 is connected to clutch 84 and will disengage the clutch whenever the movable arm is engaged by plate 92. As previously explained, the initial movement of arm 67 is caused by one of the rollers of wheel 90 engaging and rotating wheel 94. Movement is imparted to wheel 90 by a predetermined number of moving objects passing from the discharge end of arm 67 thereby causing a counter to provide a signal for the engagement of clutch 84 so as to move arm 67 to the next inlet 61. The arm is stopped at the next inlet by plate 92 engaging switch 108 thereby causing the clutch to disengage the motor with respect to wheel 90. Further movement of the arm past the inlet is prevented since convex surface 104 and 103 are engaged with one of the concave surfaces 105 (FIG. 7). The arm will not move until the electric eye again counts the predetermined number of moving objects supplying a signal to a counter which in turn provides a signal to activate the clutch. Plate 92 in addition to disengaging the electric clutch also resets the counter which begins another count so as to repeat the cycle.

A pair of switches 109 and 110 (FIG. 3) are respectively mounted to members 111 and 112 which are secured to beams 70 and 69. Switches 109 and 110 have respectively movable arms 113 and 114 which will contact arm 67 whenever the arm is positioned at the opposite ends of arc 80. Movement of arms 113 or 114 will cause motor 83 to reverse its rotatable output thereby allowing for the reverse pivotal movement of arm 67.

When arm 67 is aligned with either of the two outer inlets 61, it is desirable to feed another predetermined group of moving objects into the outer lane prior to the arm moving to the inner lane. For example, if arm 67 (FIG. 3) were to swing from lane 115 to lane 117 and back without discharging two groupings of moving objects into the outer lanes, then lane 116 would be provided with twice the number of moving objects as the outer lanes. Thus, when arm 67 engages the moveable arm 113 of switch 109, the cam plate 92 will have just engaged the movable arm of switch 108. As the motor is reversed, and arm 67 starts to pivot back towards lane 115, plate 92 will once again engage the movable arm of switch 108 thereby disengaging the clutch and allowing the movable arm to discharge a second group of moving objects into lane 117.

Arm 67 includes a pair of horizontally extending bars 118 and 119 (FIG. 3) which are in spaced relationship and connected together by cross bars 120. The spacing between bars 118 and 119 may be changed simply by changing th length of cross bar 120 thereby facilitating different sizes of moving objects. Bars 118 and 119 define a channel or tunnel through which the moving objects pass. It may therefore be seen that the arm is hollow for receiving the moving objects.

It is desirable to move the three rows 115 through 117 of objects at a speed slower than the single row of objects within arm 67 to insure that the pivoting arm will be able to fill the three separate rows at all times. Thus, a pair of conveyors 53 and 121 are utilized and driven at different speeds with the gap therebetween covered by a spacing plate 68 secured to frame 51. The objects are moved through the arm by conveyor 121 which is a continuous belt or other suitable type of conveyor. Likewise, conveyor 53 may be a continuous belt or other type of conveyor.

In order to adjust the length of arc through which arm 67 pivots, the inner end of rack 96 may be connected at various locations along bar 119. Coupling 99 has a fastener 122 which extends lockingly against bar 119 so as to secure the coupling thereto. Fastener 122 may be loosened so as to reposition coupling 99. Rack 96 is pivotally connected by pin 123 to coupling 99. In addition to the movable mounting of the inner end of rack 96, the outer end of the rack in conjunction with the driving means is movably mounted with respect to frame 51. A hand crank 124 (FIG. 4) is mounted to threaded rod 125 which is rotatably mounted to and captive on bar 70. A captive nut 126 is mounted to plate 82 and threadedly receives rod 125. As a result, when crank 124 is turned, plate 82 is caused to move with respect to frame 51. Plate 82 (FIG. 3) is mounted to carriage 127 which is slidably mounted on bar 70. The bottom end of plate 82 is slidable against a strip 128 (FIG. 5) secured to frame 51.

The Geneva mechanism is particularly advantageous to drive the pivoting arm in that it provides a stable and smooth acceleration and deceleration of the arm. The pivoting arm is positively controlled from inlet to inlet as a result of the Geneva mechanism. It will be obvious from the above description that the dividing apparatus may be easily installed over an existing conveyor and that the apparatus may be quickly adjusted to provide for a different requirement. For example, the length of the arc may be easily changed by adjusting the rack along the length of the pivoting arm. Likewise, the arm may be readily changed to receive a different sized moving object. A particular advantage of the electric eye arrangement is that the pivoting arm will wait until the correct number of moving objects are discharged into a lane. Thus, the arm will not pivot to the next position in the event that moving objects are not supplied quickly enough to the pivoting arm.

Many variations in the present invention are contemplated and included herein. For example, in lieu of the rack and pinion arrangement, a sprocket and chain may be used to pivotally move the arm. The sprocket would be attached to the driven wheel shaft whereas the chain would be mounted above the arm extending across the conveyor. In lieu of a single pivoting arm, it is also possible to have a plurality of arms in adjacent relationship atop the conveyor. Thus, two lanes would be fed simultaneously by two pivoting arms.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An apparatus for dividing moving objects from one row into a plurality of rows each in a separate path comprising:

a frame;

an arm having a channel and a discharge end through which said moving objects pass with said arm being movably mounted to said frame; and, drive means operably connected to said arm being operable to provide motion to said arm and move said discharge end past each path, said drive means including interrupting means operable to interrupt said motion and stop said discharge end at each path;

said arm is pivotally mounted about a pivot axis to said frame with said discharge end moving through an arc;

said drive means includes a motor connected to said interrupting means and linkage connected between said arm and said interrupting means;

said interrupting means includes a Geneva mechanism and a rotatably mounted shaft with a pinion thereon, said Geneva mechanism has a driven wheel on said shaft and a driver weel connected to the output of said motor, said driver wheel has at least one roller thereon and said driven wheel has radial slots engageable with said roller, said output rotates said driver wheel causing said roller to engage one of said slots causing intermittent movement of said driven wheel, said shaft and said pinion; and a cam mounted to rotate with said driver wheel, an end of the cycle switch contactable by a portion of said cam and operably connected to said clutch to disengage said motor from said Geneva mechanism, said portion of said cam being oriented with respect to said roller so that said portion contacts said switch when said roller has just left one of said slots.

2. An apparatus for dividing moving objects from one row into plurality of rows each in a separate path comprising:
- a frame;
- an arm having a channel and a discharge end through which said moving objects pass with said arm being movably mounted to said frame; and,
- drive means operably connected to said arm being operable to provide motion to said arm and move said discharge end past each path, said drive means including interrupting means operable to interrupt said motion and stop said discharge end at each path;
- said arm is pivotally mounted about a pivot axis to said frame with said discharge end moving through an arc;
- said drive means includes a motor connected to said interrupting means and linkage connected between said arm and said interrupting means;
- counting means including a counter mounted to said arm near said discharge end which counts the moving objects discharged therefrom, said counting means being operable to produce a signal upon obtainment of a predetermined number of objects discharged;
- a clutch mounted on said frame connecting said interrupting means to said motor upon receipt of said signal;
- switch means mounted to said frame and positioned at the opposite ends of said arc to contact said movable arm, said switch means being operable when contacted by said arm to reverse said output of said motor;
- said movable arm has a pair of side frames spaced apart and cross bars removably connecting said side frames together, said side frames are adjustably movable apart to fittingly receive a different size of moving object.

3. An apparatus for dividing moving objects from one row into a plurality of rows each in a separate path comprising:
- a frame;
- an arm having a channel and a discharge end through which said moving objects pass with said arm being movably mounted to said frame; and,
- drive means operably connected to said arm being operable to provide motion to said arm and move said discharge end past each path, said drive means including interrupting means operable to interrupt said motion and stop said discharge end at each path;
- said arm is pivotally mounted about a pivot axis to said frame with said discharge end moving through an arc;
- said drive means includes a motor connected to said interrupting means and linkage connected between said arm and said interrupting means;
- counting means including a counter mounted to said arm near said discharge end which counts the moving objects discharged therefrom, said counting means being operable to produce a signal upon obtainment of a predetermined number of objects discharged; and,
- a clutch mounted on said frame connecting said interrupting means to said motor upon receipt of said signal;
- switch means mounted to said frame and positioned at the opposite ends of said arc to contact said movable arm, said switch means being operable when contacted by said arm to reverse said output of said motor;
- a carriage movably mounted on said frame and having said drive means mounted thereon, a worm rotatably mounted on said frame and threadedly connected to said carriage, said worm being rotatable to locate said carriage at different positions along said frame and wherein said linkage is removably connected to different locations along the length of said arm.

4. The apparatus of claim 3 and further comprising:

- a conveyor mounted on said frame and positioned beneath said arm for moving said objects through said arm.

* * * * *